United States Patent [19]

Ono

[11] 3,934,258

[45] Jan. 20, 1976

[54] EXPOSURE STORAGE DEVICE

[75] Inventor: Shigeo Ono, Yokohama, Japan

[73] Assignee: Nippon Kogaku K.K., Tokyo, Japan

[22] Filed: Feb. 12, 1974

[21] Appl. No.: 441,854

[30] Foreign Application Priority Data

Feb. 10, 1973 Japan............................ 48-20491[U]

[52] U.S. Cl..................... 354/60 R; 354/50; 354/51
[51] Int. Cl.$^2$...................... G03B 7/08; G03B 17/00
[58] Field of Search ............ 354/60, 202, 204, 205,
354/206, 207, 209, 212, 213, 214, 215, 234,
268, 51, 50

[56] References Cited

UNITED STATES PATENTS

| | | | |
|---|---|---|---|
| 3,367,251 | 2/1968 | Furvta................................. | 354/60 |
| 3,425,327 | 2/1969 | Stuper et al. ....................... | 354/204 |
| 3,623,410 | 11/1971 | Mita..................................... | 354/60 |
| 3,693,524 | 9/1972 | Furvta................................. | 354/234 |
| 3,756,131 | 9/1973 | Kuramoto et al..................... | 354/51 |

Primary Examiner—Richard M. Sheer
Assistant Examiner—Russell E. Adams, Jr.
Attorney, Agent, or Firm—Fitzpatrick, Cella, Harper & Scinto

[57] ABSTRACT

An exposure value storage device for use in a photographic camera includes a metering circuit, a storage circuit for storing the output of the metering circuit, and a control circuit for controlling exposure in accordance with a storage value stored in the storage circuit. A storage switch is provided for electrically disconnecting the metering and storage circuits to cause the storing function of the storage circuit. The metering and storage circuits may be supplied with power from a power source through a power switch. The power switch may be movable between two positions for opening and closing the power switch. The storage switch may be actuated by a member movable between two positions for closing and opening the storage switch electrically to connect and disconnect the metering and storage circuits. The first-named member, when in the first of its two positions, prevents movement of said another member from its first position to its second position.

5 Claims, 2 Drawing Figures

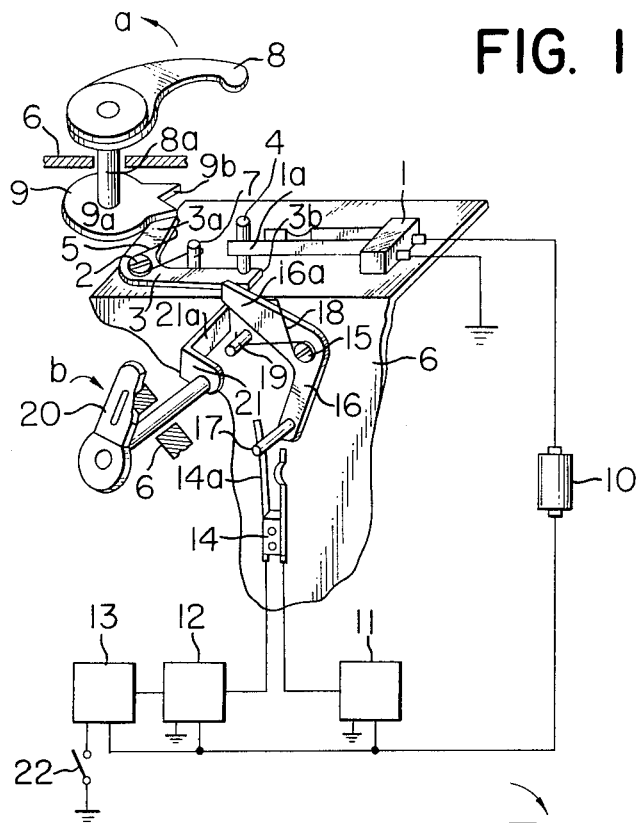
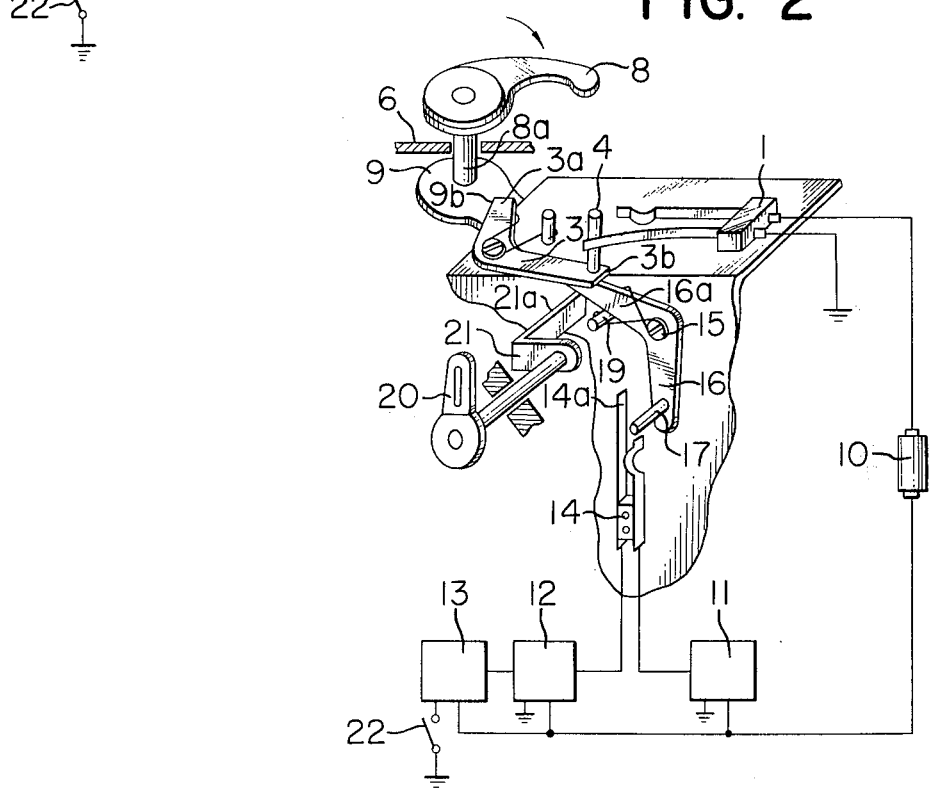

EXPOSURE STORAGE DEVICE

BACKGROUND OF THE INVENTION

1. Field of the Invention

This invention relates to an exposure value storage device, and more particularly to an exposure value storage device for use in a camera having means for electrically measuring the brightness of an object to be photographed and temporarily storing the result of such measurement to control an exposure in accordance with the stored value. The device, which can be normally operable, can fix the stored value at such point of time irrespective of any variation in the measurement value obtained thereafter, to correct the exposure during counter-light photography or the like.

2. Description of the Prior Art

By way of example, it is known that to take a picture of a person standing under counter-light conditions, a camera is first made to closely face the person, then the exposure meter of the camera is operated so as to measure chiefly the brightness of light reflected from the person and an exteriorly operable member is operated to store the measurement of brightness, whereafter the camera is moved back away from the person to determine the composition and then the shutter is released, whereby the exposure in the camera is determined in accordance with the stored brightness measurement in spite of the presence of highly intense incident light coming from the background of the person. By doing so, the photographer can accurately fit the exposure to a particular object for which he wants to provide a proper exposure, even if he is so poorly experienced in photography that he is not sure about how much exposure correction should be effected under counter-light conditions.

However, if the photographer should mistakenly operate the exposure storage device before the power switch is closed to supply current to the circuits, the device would store zero measurement and the result is that even if the power switch is thereafter closed and the shutter released, the exposure control device would fail to perform its normal operation.

SUMMARY OF THE INVENTION

I have conceived by the present invention an exposure value storage device by which I am able to overcome the foregoing difficulty.

Essentially, the exposure device of the present invention may comprise a metering circuit for electrically measuring the brightness of an object to be photographed, a storage circuit for storing the output of the metering circuit, a storage switch for electrically disconnecting the metering and storage circuits to cause the storage circuit to store a value, a control circuit for controlling exposure in accordance with the storage value stored in the storage circuit, a power switch for supplying current from a power source to the metering circuit and storage circuit, a first member exteriorly operable to actuate the power switch and movable between a first position for opening the power switch and a second position for closing the power switch, and a second member exteriorly operable to actuate the storage switch and movable between a first position for closing the storage switch to electrically connect the metering and storage circuits and a second position for opening the storage switch to electrically disconnect the metering and storage circuits. The first member when in its first position prevents the second member from moving its first position to its second position.

I prefer that the path of movement of the first member and the path of movement of the second member intersect each other so that the first member, when in its first position, lies in the path of movement of the second member to prevent the latter member from moving from this first position to its second position. I also prefer to arrange these members so that the second member, when in its second position, prevents the first member from moving from its second position to its first position.

According to a further aspect of the invention, I arrange the first member so that it is operatively associated with a film advance lever so that the first member assumes its first position when the film advance lever is in its retracted position and shifts to its second position when the film advance lever is rotated to its preparatory position.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 1 is a combined perspective view and block diagram showing the exposure device of the present invention in its operative position; and FIG. 2 is a view similar to FIG. 1 but showing the device in its inoperative position.

DESCRIPTION OF THE PREFERRED EMBODIMENT

Referring to the drawings, there is shown one embodiment of the present invention wherein a power switch 1 permits current supply from a battery 10 to a metering circuit 11, a storage circuit 12 and a control circuit 13, and is biased toward closed position. The opening-closing of the power switch 1 is governed by a switching member comprising a lever 3 pivotally mounted on a pivot pin 2 and a pin 4 of electrically insulative material studded in the lever 3. The pin 4 is engageable with the tip end of one contact member 1a of the switch 1. The lever 3 is biased for counter-clockwise rotation by the force of a spring 5 which may be supported on the pivot pin 2, but the lever 3 is normally restrained by a pin 7 studded in a camera body 6.

In this position, the pin 4 is out of engagement with the contact member 1a to close the power switch 1. To enable the opening-closing of the power switch 1 to be operated from outside, there is provided a film advance lever 8 and a cam 9 formed integrally therewith through a common shaft 8a. The cam 9 is provided with a ramp 9a for engagement with one end 3a of the lever 3, and a notch 9b for engageably receiving the end 3a of the lever 3 when the film advance lever 8 has been rotated back into its retracted position, i.e., when the lever 8 has been rotated slightly clockwise from its position shown in FIG. 1 to its position shown in FIG. 2.

A storage switch 14 is mounted on the camera body 6 and serves to transmit the measurement information from the metering circuit 11 to the storage circuit 12. One contact member 14a of the switch 14 is engageable by a pin 17 of electrically insulative material studded in a lever 16 mounted on the camera body 6 pivotally about a pivot pin 15.

The lever 16 is biased for counter-clockwise rotation by the force of a spring 18, which may be supported on the pivot pin 15, but is normally restrained by a pin 19. A lever 20 is mounted on the camera body 6 for pivotal movement with a lever 21 to which it is connected, and is operable from outside. The lever 21 has a bent portion 21a which is engageable with the lever 16.

The lever 3 and the lever 16 are in such a positional relationship that when the lever 3 assumes its rotated position the lever 16 is stopped from clockwise rotation with one end 16a thereof restrained by the underside of the corresponding end 3b of the lever 3 (see FIG. 2) and that when the lever 16 assumes its rotated position in a clockwise direction, the lever 3 is stopped from clockwise rotation with the end 3b thereof interfering with the end 16a of the lever 16 (see FIG. 1).

The operation of my exposure storage device will now be described. The film advance lever 8 normally assumes its retracted position when the camera is not in operation. Rotation of the film advance lever 8 from its retracted position to a certain angularly rotated position does not result in any advance of the film. The latter position is herein referred to as the "preparatory position". The film advance lever 8 initiates its film advance operation from the preparatory position. When the film advance lever 8 is rotated from its retracted position to the preparatory position in the direction indicated by arrow a (FIG. 1) to operate the metering circuit 11 and the storage circuit 12, the lever 3 is rotated counter-clockwise by the force of the spring 5 to assume the position shown in FIG. 1. In this position, the pin 4 is disengaged from the contact member 1a of the power switch 1 to close the power switch, thus permitting current supply from the battery to the circuits. Under such conditions, the metering and storage circuits are both normally operated and therefore, when the lever 20 is actuated in the direction of arrow b, the lever 21 is also rotated in the same direction to rotate the lever 16 clockwise against the force of the spring 18, so that the pin 17 actuates the contact member 14a to open the storage switch 14 and thus, at this point of time, to fix the information in the storage circuit 12. Also, even if the film advance lever 8 is actuated in the direction opposite to the arrow a in an effort to open the power switch 1 under the operative condition of the exposure storage device, the film advance lever cannot be brought into its retracted position because the clockwise rotation of the lever 3 is blocked by the end 16a of the lever 16.

This prevents the storage device from being operated to effect storage of an incorrect value with the power switch 1 opened to cut off the current supply to the circuits, whereafter if the power switch 1 is closed to release the shutter, the exposure would be controlled in accordance with the incorrect storage value.

Further, a second power switch 22 is provided which may be closed in response, for example, to the movement of a mirror driving means in a single-lens reflex camera to permit current supply to the control circuit 13. This means that not all of the circuits need be supplied with current when the power switch 1 is in its closed position.

Where the present device is applied to a single-lens reflex camera wherein a light-sensing element receives the light passed through an objective lens, the storage switch 14 may be designed such that its opening-closing is controlled in response to the movement of the mirror driving means independently of the control effected by the lever 16.

Applications of the present device are not restricted by the types of the metering and storage circuits. In other words, the present device may be employed whether the circuits are of the analog type or of the digital type.

From the foregoing description, it will be seen that by the present invention, any photographer can accurately fit the exposure to a particular object for which he wants to provide a proper exposure, even if he is so poorly experienced in photography that he is not sure about how much exposure correction should be effected under counter-light conditions. Moreover, it will further be appreciated that this may be accomplished without occurrence of the condition whereby before the power switch is closed to supply power, the exposure storage device may be operated to store zero measurement, whereafter the power switch is closed to release the shutter.

I believe that the construction and operation of my novel exposure storage device will now be understood and that its advantages will be fully appreciated by those persons skilled in the art.

I claim:

1. An improved exposure value storage device for a photographic camera of the type having a metering circuit (11) for electrically measuring the brightness of an object to be photographed:

a storage circuit (12) for storing the output of said metering circuit (11);

a storage switch (14) for electrically disconnecting said metering circuit and said storage circuit (12) to cause said storage circuit (12) to store an exposure value;

a control switch (13) for controlling exposure in accordance with the value stored in said storage circuit (12); and a power switch (1) for supplying current from a power source (10) to said metering circuit (11) and said storage circuit (12), wherein the improvement comprises:

a first member (3) manually operable from exterior of the camera to actuate said power switch (1), said first member (3) being movable between a first position for opening said power switch and a second position for closing said power switch; and a second member (16) manually operable from exterior of the camera to actuate said storage switch, said second member (16) being movable between a first position for closing said storage switch (14) to electrically connect said metering circuit (11) and said storage circuit (12) and a second position for opening said storage switch (14) to electrically disconnect said metering circuit (11) and said storage circuit (12); the path of movement of said first member (3) and the path of movement of said second member (16) intersecting each other so that said first member (3) when in its first position lies in the path of movement of said second member (16) to prevent said second member (16) from moving from its first position to its second position.

2. A device according to claim 1, wherein said second member (16) when in its second position prevents said first member (3) from moving from its second position to its first position.

3. A device according to claim 1, wherein the path of movement of said first member (3) and the path of movement of said second member (16) intersect each other so that said first member (3) when in its first position lies in the path of movement of said second member (16) to prevent said second member (16) from moving from its first position to its second position and that said second member (16) when in its second position prevents said first member (3) from moving from its second position to its first position.

4. A device according to claim 1, wherein said second member (16) when in its second position lies in the path of movement of said first member (3) to prevent said first member (3) from moving from its second position to its first position.

5. A device according to claim 4, wherein said first member (3) is operatively associated with a film advance lever (8) so that said first member (3) assumes its first position when said film advance lever (8) is in its retracted position and that said first member (3) shifts to its second position when said film advance lever (8) is rotated to its preparatory position.

* * * * *

UNITED STATES PATENT OFFICE
CERTIFICATE OF CORRECTION

Patent No. 3,934,258　　　　　　　　Dated January 20, 1976

Inventor(s) SHIGEO ONO

It is certified that error appears in the above-identified patent and that said Letters Patent are hereby corrected as shown below:

First page, bibliographic data, at "[30]", change "Feb. 10, 1973" to -- Feb. 19, 1973 --.
    Column 1, line 13, change "normally" to -- manually --.
    Column 2, line 2, after "moving" insert -- from --.

Signed and Sealed this twenty-seventh Day of April 1976

[SEAL]

Attest:

RUTH C. MASON  
Attesting Officer

C. MARSHALL DANN  
Commissioner of Patents and Trademarks